United States Patent
Guaita et al.

[11] Patent Number: 6,060,562
[45] Date of Patent: May 9, 2000

[54] THERMOPLASTIC COMPOSITION FOR FUEL LINES

[75] Inventors: Cesare Guaita, Tradatte; Franco Speroni, Ceriano Laghetto, both of Italy

[73] Assignee: Nyltech Italia, Laghetto, Italy

[21] Appl. No.: 09/043,932

[22] PCT Filed: Sep. 27, 1996

[86] PCT No.: PCT/IB96/01148

§ 371 Date: Jun. 5, 1998

§ 102(e) Date: Jun. 5, 1998

[87] PCT Pub. No.: WO97/12938

PCT Pub. Date: Apr. 10, 1997

[30] Foreign Application Priority Data

Sep. 29, 1995 [FR] France .................... 95 11681

[51] Int. Cl.[7] .............. C08F 8/30; C08L 23/00; C08L 47/00; C08L 77/00; C08K 5/43

[52] U.S. Cl. ............ 525/184; 428/36.9; 428/36.92; 524/168; 524/528; 524/538; 524/539; 525/183; 525/185; 525/186

[58] Field of Search ............... 428/36.9, 36.92; 525/183, 184, 185, 186; 524/168, 528, 538, 539

[56] References Cited

U.S. PATENT DOCUMENTS 5,071,924  12/1991  Koch et al. .
5,256,460  10/1993  Yu .

FOREIGN PATENT DOCUMENTS 0 315 451  5/1989  European Pat. Off. .
0 355 792  2/1990  European Pat. Off. .
0 403 109  12/1990  European Pat. Off. .
0 469 693  2/1992  European Pat. Off. .
588253  3/1994  European Pat. Off. .

*Primary Examiner*—Patrick D. Niland
*Attorney, Agent, or Firm*—Burns, Doane, Swecker & Mathis, L.L.P.

[57] ABSTRACT

A thermoplastic composition with improved properties for making fuel containers, e.g. for fuel oil, petrol, diesel oil or alcohol, and specifically for making fuel lines for feeding fuel to a fuel tank or engine. The thermoplastic composition includes a thermoplastic polymer matrix and at least one compound that enhances the resilience of thermoplastic compositions. Said matrix consists of a mixture of: at least one first thermoplastic copolymer produced by copolymerising $\epsilon$-caprolactam with at least one monomer selected from the group which includes an amino acid having at least nine carbon atoms, or the corresponding lactam, and a mixture of hexamethylenediamine and a diacid having at least nine carbon atoms, the weight ratio of the $\epsilon$-caprolactam to the total amount of hexamethylenediamine and diacid being 4–9; and at least one second thermoplastic polymer or copolymer produced by polymerising monomers having at least nine carbon atoms. The amount of second polymer or copolymer in the matrix is 40–80 wt. %, and the amount of resilienc modifying compound is 20–50 wt. %, based on the weight of the thermoplastic composition. In use, articles such as fuel lines produced by shaping said composition have excellent properties.

14 Claims, No Drawings

THERMOPLASTIC COMPOSITION FOR FUEL LINES

The invention relates to a thermoplastic composition exhibiting improved properties for the production of containers for fuels, such as fuel oil, petrol, diesel oil or alcohol, and more particularly lines for feeding the fuel tank or feeding the engine with fuel.

The term "fuel" should be understood as comprising the various mixtures of hydrocarbons used as fuel in internal combustion or high-compression engines. Thus, this term in particular encompasses fuel oil, diesel oil and all categories of petrol, as well as mixtures of hydrocarbons and alcohols, or the like.

It is known that compositions comprising polyhexamethyleneadipamide (PA 6.6) or polycaprolactam (PA 6) as thermoplastic polymer matrix are not suitable for the production of fuel lines.

This is because these polymers do not exhibit resistance to saline solutions, such as a zinc chloride ($ZnCl_2$) solution. Such a resistance is required by car manufacturers and is defined in particular by International Standard SAE 844 for the resistance of fuel lines to saline solutions. In brief, this test consists in determining the resistance of the material to cracking or splitting when the material is immersed in a saline solution, generally of $ZnCl_2$, with application of a flexural force. This property is generally known under the name of resistance to stress cracking or "$ZnCl_2$ test". Thus, a pipe made of PA 6.6 or PA 6, immersed in a $ZnCl_2$ solution and placed under mechanical stress, splits and even bursts in a few minutes.

To overcome this problem, provision has been made to use polyamides obtained from monomers with a higher number of carbon atoms, namely 11 or 12.

These polyamides 11 or 12 exhibit an improved resistance to the $ZnCl_2$ test but have a limited impact strength at ambient temperature and a high manufacturing cost. In addition, these polymers have a high permeability to hydrocarbons.

Provision has also been made, in U.S. Pat. No. 5,256,460, for a thermoplastic composition comprising a mixture of a thermoplastic copolymer with a polyolefin comprising grafted functional groups. The thermoplastic copolymer is obtained by copolymerization of ε-caprolactam with amino acid monomers or their lactams comprising at least 9 carbon atoms or a mixture of hexamethylenediamine and dicarboxylic acid monomers comprising at least 9 carbon atoms. The copolyamide obtained by copolymerization of a monomer mixture comprising ε-caprolactam, hexamethylenediamine and a dimeric acid comprising 36 carbon atoms (PA 6/6.36) is described as preferred copolymer.

This copolymer can also be used as a mixture with polyamide 11 or 12 in proportions by weight of 0.1 to 40% by weight with respect to the composition.

It is also described that the mixture can comprise polyamide 6 in a proportion of 0.1 to 20% by weight and preferably of 1 to 7% by weight with respect to the composition.

These compositions exhibit good resistance to the "$ZnCl_2$ test". However, certain mechanical properties of the copolymer 6/6.36 are weaker than those of polyamides PA 6 or PA 6.6, for example the bursting strength.

In order to overcome these disadvantages, the Applicant Company provides a composition exhibiting a degree of resistance to the "$ZnCl_2$ test" of the same order of magnitude as the compositions of U.S. Pat. No. 5,246,460 but with superior mechanical properties.

To this end, the Applicant Company provides a thermoplastic composition comprising a matrix made of thermoplastic polymer and at least one compound which improves the resilience of thermoplastic compositions, characterized in that the matrix is composed of a mixture of at least one first thermoplastic copolymer obtained by copolymerization of ε-caprolactam with at least one of the monomers chosen from the group comprising:

an amino acid comprising at least 9 carbon atoms or the corresponding lactam a mixture of hexamethylenediamine with a diacid comprising at least 9 carbon atoms, the ratio by weight of ε-caprolactam to the hexamethylenediamine and diacid total being between 4 and 9, and of at least one second thermoplastic polymer or copolymer obtained by polymerization of monomers comprising less than 9 carbon atoms. The content by weight of the second polymer or copolymer in the matrix is between 40 and 80% by weight, the content by weight of resilience-modifying compound being between 20 and 50% of the thermoplastic composition.

The first thermoplastic polymer is a copolymer corresponding to that described in U.S. Pat. No. 5,256,460, the text of which is included in the present application.

Mention may be made, as preferred copolyamide, of the copolyamides 6/6.36 already described above or the copolymers obtained from ε-caprolactam, hexamethylenediamine and undecanedioic acid monomers.

The second thermoplastic polymer is a polymer obtained from monomers comprising a number of carbon atoms of less than 9. These polymers have as characteristic that of not being resistant to the "$ZnCl_2$ test". Mention may be made, as example of second thermoplastic polymer, of PA 6.6, PA 6, their copolymers and copolyamides based on PA 6.6 and/or PA 6 modified by the addition, in a greater or lesser proportion, of monomers such as terephthalic and isophthalic acids, meta-xylylenediamine, 1,4-diaminocyclohexane, 1,4-dicarboxycyclohexane, 1,4-diaminocyclohexane or analogues. This second thermoplastic polymer can also comprise a small proportion of monomers comprising more than 9 carbon atoms, for example dodecanoic acid, azelaic acid, sebacic acid or isophoronediamine, without on that account departing from the scope of the invention.

In contrast to the teaching of U.S. Pat. No. 5,256,460, these second thermoplastic polymers are present in the composition of the invention at a high concentration. In fact, the second polymer/first polymer ratio can vary between 1.6 and 4. In contrast, the examples of U.S. Pat. No. 5,256,460 illustrate compositions comprising a PA 6/PA 6/6.36 ratio of 1/15.

The compositions of the invention comprising a high concentration of polyamide with a short carbon chain (PA 6, PA 6.6) exhibit a resistance to the "$ZnCl_2$ test" which is equivalent to that of the known compositions and mechanical properties which are markedly superior.

According to another characteristic of the invention, the compound which modifies the resilience of the composition is advantageously present at a concentration by weight of between 25 and 45% with respect to the overall composition.

Mention may be made, as resilience-modifying compound suitable for the invention, by way of example, of ionomers, polymers or copolymers of olefins comprising functional groups, such as carboxyl, ester, anhydride, glycidyl or carboxylate groups, such as maleic anhydride, methacrylic acid and acrylic acid. These functional groups are incorporated in the polyolefins by copolymerization or by grafting.

Such compounds are known in the state of the art and are described in numerous publications.

According to another characteristic of the invention, these polymers or copolymers comprising functional groups can be combined with other compounds which modify the resilience but which do not contain functional groups which allow coupling with the thermoplastic matrix. Mention may be made, by way of example, of olefin polymers and copolymers, such as polyethylene, polypropylene, copolymers of ethylene and of propylene, EPDMs, EPR, hydrogenated or block poly(styrene-butadiene) or copolymers of olefins with vinyl acetate.

However, according to the invention, the polymer containing functional groups must be present according to a concentration by weight of at least 30%, whereas the non-functionalized polymer will only be present to a maximum concentration by weight of 30%.

The compositions of the invention can also comprise a plasticizer of the polyamide matrix, such as, for example, sulphonamides and more particularly N-butylbenzenesulphonamide. This plasticizer is advantageously present with a concentration by weight of between 0 and 15% with respect to the overall composition.

Another subject of the invention is the articles obtained by shaping a composition according to the invention by the usual shaping techniques, such as, for example, moulding, extrusion, extrusion blow-moulding or the like.

Mention may more particularly be made, as article, of petrol tanks and more advantageously still of lines for delivering petrol to the engine or lines for feeding the tanks.

These examples of articles are given only by way of indication but correspond to the components requiring good resistance to the fuel, in particular a low permeability, and high mechanical and flexibility properties, in order to be able to withstand stresses and vibrations.

The hexamethylenediamine and the dimeric acid are present according to a stoichiometric ratio, whereas the ratio by weight of the hexamethylenediamine to the caprolactam is 0.033.

In order to regulate and control the molecular weight of the polymer, a monoacid (azelaic acid) is added.

The solution is polymerized under an inert atmosphere in an autoclave. The polymerization is subsequently continued by placing under reduced pressure (100 torr) until the desired viscosity is obtained. The relative viscosity of the copolymer, measured in sulphuric acid, is generally between 2.5 and 3.5; this viscosity is indirectly monitored and assessed by measuring the torque of forces necessary to drive the stirrer in the reactor.

EXAMPLES 2 TO 8 AND COMPARATIVE EXAMPLES A TO E

The compositions of the invention are prepared by mixing in a twin-screw extruder by addition of the various components and mixing at a temperature of between 233° C. and 288° C. The mixture is extruded at 266° C. in the form of rods which are subsequently cut into the form of granules.

The various compositions of the invention are listed in Table I hereinbelow with their compositions.

Examples A to E are comparative examples which are outside the present invention. Example A corresponds to a composition (Example 4) described in U.S. Pat. No. 5,256,460.

The polyamide matrix is composed of a mixture of the copolymer PA 6/6.36 obtained according to Example 1 and of polycaproamide with a relative viscosity, measured in sulphuric acid, of 3.8.

TABLE I

| Example | A | B | C | D | E | 2 | 3 | 4 | 5 | 6 | 7 | 8 |
|---|---|---|---|---|---|---|---|---|---|---|---|---|
| PA 6/6.36 | 45 | 45 | 62 | 46.5 | 7.2 | 31 | 23 | 18.5 | 12.5 | 30 | 29 | 15.5 |
| PA 6 | 5 | | | 15.5 | 55.8 | 31 | 37 | 43.5 | 49.5 | 30 | 29 | 46.5 |
| PA 12 | 10 | | | | | | | | | | | |
| Plasticizer | 0 | 8 | 8 | 8 | 8 | 8 | 8 | 8 | 8 | 10 | 12 | 8 |
| EP-g-MA | 20 | 47 | 30 | 30 | 30 | 30 | 30 | 30 | 30 | 30 | 30 | 20 |
| EAA | 10 | | | | | | | | | | | |
| Ionomer | 10 | | | | | | | | | | | |
| PA 6 concentration in matrix (%) | 8 | 0 | 0 | 25 | 90 | 50 | 61.6 | 70.16 | 79.8 | 50 | 50 | 75 |

Other advantages and details of the invention will become more clearly apparent in light of the examples given hereinbelow, solely by way of illustration and without limiting effect.

The percentages are expressed as percentage by weight with respect to the overall composition, except when otherwise indicated.

EXAMPLE 1

Synthesis of the Copolymer PA 6/6.36

The copolymerization of the copolymer forming the first component of the thermoplastic matrix is carried out according to the procedure described in U.S. Pat. No. 5,256,460 and briefly repeated hereinbelow:

A solution of hexamethylenediamine and of a dimeric acid containing 36 carbon atoms in caprolactam is prepared.

The plasticizer is N-butylbenzene-sulphonamide.

EP-g-MA is an ethylene/propylene copolymer grafted with maleic anhydride sold by the company Exxon under the trade name Exxelor VA 1801.

Ionomer is a polymer sold by the company E.I. Du Pont de Nemours under the trade name Surlyn 9720.

EAA is a copolymer of ethylene and of acrylic acid.

The compositions thus manufactured are extruded in a single-screw extruder in the pipe or line form with an internal diameter of 6 mm and a thickness of 1 mm. The mechanical and resistance to the "$ZnCl_2$ test" properties of the various compositions are determined on the extruded lines and combined in Table II hereinbelow.

TABLE II

| Properties | A | B | C | D | E | 2 | 3 | 4 | 5 | 6 | 7 | 8 |
|---|---|---|---|---|---|---|---|---|---|---|---|---|
| Modulus of elasticity (N/mm$^2$) | 921 | — | 502 | 450 | 994 | 656 | 751 | 856 | 902 | 436 | 348 | 520 |
| Tensile stress at break (N/mm$^2$) | 19.3 | 27.3 | 16.2 | 24.2 | 36.6 | 25.9 | 28.2 | 3.5 | 36.1 | 32.6 | 27 | 24 |
| % elongation at break | 189 | 210 | 183 | 160 | 157 | 192 | 190 | 183 | 171 | 169 | 141 | 200 |
| Izod impact Strength at 23°C. (J/m) | No break | No break | No break | No break | 1078 | 1022 | 1017 | 1096 | 1045 | No break | No break | No break |
| Izod impact Strength at −35° C. (J/m) | 474 | 937 | 430 | 368 | — | 497 | 801 | 871 | 850 | 552 | 426 | — |
| % elongation in methanol | 5.68 | 1.76 | 1.84 | 180 | — | 1.94 | — | 2.33 | — | 1.64 | 1.45 | 1.71 |
| Resistance to the ZnCl$_2$ test (hour) | >1000 | >1000 | >1000 | >1000 | <80 | >1000 | >1000 | >1000 | >1000 | >1000 | >1000 | >1000 |
| Bursting pressure (bar) | 33.4 | 34 | 32 | 39 | 65 | 44.7 | 52 | 61 | 65 | 45 | 42 | 46 |

The resistance to stress cracking in a ZnCl$_2$ solution is determined according to the procedure described in International Standard SAE J 844 issued in June 1963 and revised on Jun. 12, 1990. This test consists in subjecting a pipe with an internal diameter of 6 mm and an external diameter of 8 mm, extruded with the material to be tested, to a predetermined radius of curvature and in immersing the pipe, thus curved, in a fresh 50% by weight zinc chloride solution for 200 hours at 24° C. After removing the pipe from the solution, no crack should appear on the external surface of the latter.

The bursting pressure is also determined according to the procedure described in the abovementioned Standard SAE J 844 and consists in determining at what pressure a pipe bursts after maintaining the pressure for a time of 3 to 15 seconds.

The Izod impact strengths are determined on test specimens according to the method defined in ASTM Standard D-256.

The elongation in methanol is determined on extruded pipes according to the following test: round metal rods with an external diameter substantially equal to the internal diameter of the pipes to be tested are introduced into sections of pipes with a length of at least 300 mm, in order to avoid any deformation, for example flexural or torsional, of the pipes to be tested.

The assembly is conditioned by being maintained for 48 hours in a chamber at a temperature of 80° C. The assembly is subsequently brought to ambient temperature and the round rod is removed. The pipe is subsequently attached to equipment which allows the pipes to be placed and maintained in contact with a tank containing methanol. Marks are made on the pipe and their position is determined. A predetermined amount of methanol is introduced into the pipes and this amount will be kept substantially constant throughout the operation by automatic addition from the abovementioned tank. The assembly is subsequently heated and maintained at 40° C. for 72 hours. After heating, the assembly returns to ambient temperature over 2 to 3 hours. The new position of the marks on the pipe is determined. The percentage of elongation in methanol is calculated by comparison of the initial and final positions of the marks.

The tensile stress at break and the percentage of elongation at break are determined by dynamometry on sections of pipe having a length of 200 mm. To avoid any deformation of the pipes in the jaws of the dynamometer, two round metal rods are inserted at the ends of the pipes, these rods having a length equivalent to the pipe shaft clamped in the jaws and a diameter substantially equal to the internal diameter of the pipes. A tensile stress is applied to the pipe in order to obtain a rate of deformation of 50 mm/min. After break, the elongation of the pipe is determined, as well as the tensile stress.

The above examples show that the compositions with a thermoplastic matrix containing from 50 to 79.8% of PA 6 exhibit good resistance to a zinc chloride solution and to methanol, while exhibiting superior mechanical properties, in particular a higher bursting pressure, than the compositions of the prior art.

The invention relates to the compositions described above containing the components described but also to such compositions containing additives, such as nucleating agents, heat or light stabilizers, dyes, pigments or lubricants, without on that account departing from the scope of the invention. This list of additives is not limiting in nature.

We claim:

1. A thermoplastic composition comprising a matrix and a resilience-modifying compound, wherein:
   the matrix comprises a mixture of at least a first thermoplastic and a second thermoplastic,
   the first thermoplastic comprises a copolymer of:
   (i) ε-caprolactam and
   (ii) at least one of an amino acid comprising at least 9 carbon atoms, a lactam corresponding to the amino acid comprising at least 9 carbon atoms, or a mixture of hexamethylenediamine with a diacid comprising at least 9 carbon atoms having a ratio of weight % of ε-caprolactam to weight % hexamethylenediamine and diacid mixture of 4–9,
   the second thermoplastic comprises a polyamide or copolyamide of monomers comprising less than 9 carbon atoms, and the content of the second thermoplastic in the matrix is 40–80 weight % of the matrix and greater than 20 weight % of the overall composition, and the resilience-improving compound comprising 20–50 weight % of the overall composition.

2. Composition according to claim 1, characterized in that the second thermoplastic polymer comprises at least one polymer based on polycaproamide, polyhexamethyleneadipamide or their copolyamides.

3. Composition according to claim 1, wherein the resilience-modifying compound comprises between 25 and 45 weight % of the overall composition.

4. Composition according to claim 1, further comprising a plasticizer of polyamides.

5. Composition according to claim 4, wherein the plasticizer comprises less than 15 weight % of the overall composition.

6. Composition according to claim 1, wherein the number of carbon atoms in the diacidic monomer of the first copolymer is 36.

7. Composition according to claim 1, wherein the resilience-modifying compound comprises ionomers, polymers, copolymers of olefins comprising functional groups or a combination thereof.

8. Composition according to claim 7, wherein the functional group comprises at least one maleic anhydride, methacrylic acid or acrylic acid.

9. Composition according to claim 7 wherein the polymer comprising the functional groups in the composition comprises at least 30 weight % of the overall composition.

10. Composition according to claim 7, wherein the resilience-modifying compound does not include functional groups, and is present in a concentration of less than 30 weight % of the overall composition.

11. Composition according to claim 10, wherein the resilience-modifying compound does not include functional groups and comprises polymers and copolymers of olefins.

12. Line for liquid petroleum-based fuels formed from the composition according to claim 1.

13. Composition according to claim 7, wherein said functional groups comprise carboxyl, ester, anhydride, glycidyl or carboxylate groups.

14. Composition according to claim 11, wherein said polymers and copolymers of olefins comprise polyethylene, polypropylene, copolymers of ethylene and polypropylene, EPDMs, EPR, hydrongenated or block poly (styrene-butadiene) or copolymers of olefins with vinyl acetate.

* * * * *